United States Patent [19]

Northe et al.

[11] 4,404,712
[45] Sep. 20, 1983

[54] SLING HOOK

[75] Inventors: Melvin M. Northe; Dean W. Larson, both of Portland, Oreg.

[73] Assignee: Esco Corporation, Portland, Oreg.

[21] Appl. No.: 315,725

[22] Filed: Oct. 28, 1981

[51] Int. Cl.³ .............................................. F16G 11/00
[52] U.S. Cl. ............................ 24/129 R; 24/230.5 R; 294/74; 294/78 R
[58] Field of Search ............... 24/230.5 R, 230.5 AD, 24/230.5 W, 230.5 TP, 115 R, 115 A, 115 K, 115 N, 241 R, 241 S, 241 P, 241 PP, 241 PS, 241 SL, 241 SP, 241 SB, 129 R; 294/74, 82 R, 78 R

[56] References Cited

U.S. PATENT DOCUMENTS

| | | | |
|---|---|---|---|
| 1,420,487 | 6/1922 | Kent | 24/129 R |
| 1,572,347 | 2/1926 | Beck | 24/230.5 |
| 2,159,756 | 11/1936 | Bamberger | 24/230.5 |
| 2,381,531 | 4/1944 | Ehmann | 24/230.5 |
| 2,387,675 | 10/1945 | Orme et al. | 294/82 R |
| 4,073,042 | 2/1978 | Miller | 24/241 P |
| 4,097,015 | 6/1978 | Frishman | 24/230.5 |

Primary Examiner—Gene Mancene
Assistant Examiner—Kris R. Schulze
Attorney, Agent, or Firm—Tilton, Fallon, Lungmus & Chestnut

[57] ABSTRACT

A sling hook consisting of a bill portion of the lower end and a sleeve portion at the upper end where the sleeve portion is interrupted by a generally curved slot to permit twist installation of a wire rope sling.

9 Claims, 8 Drawing Figures

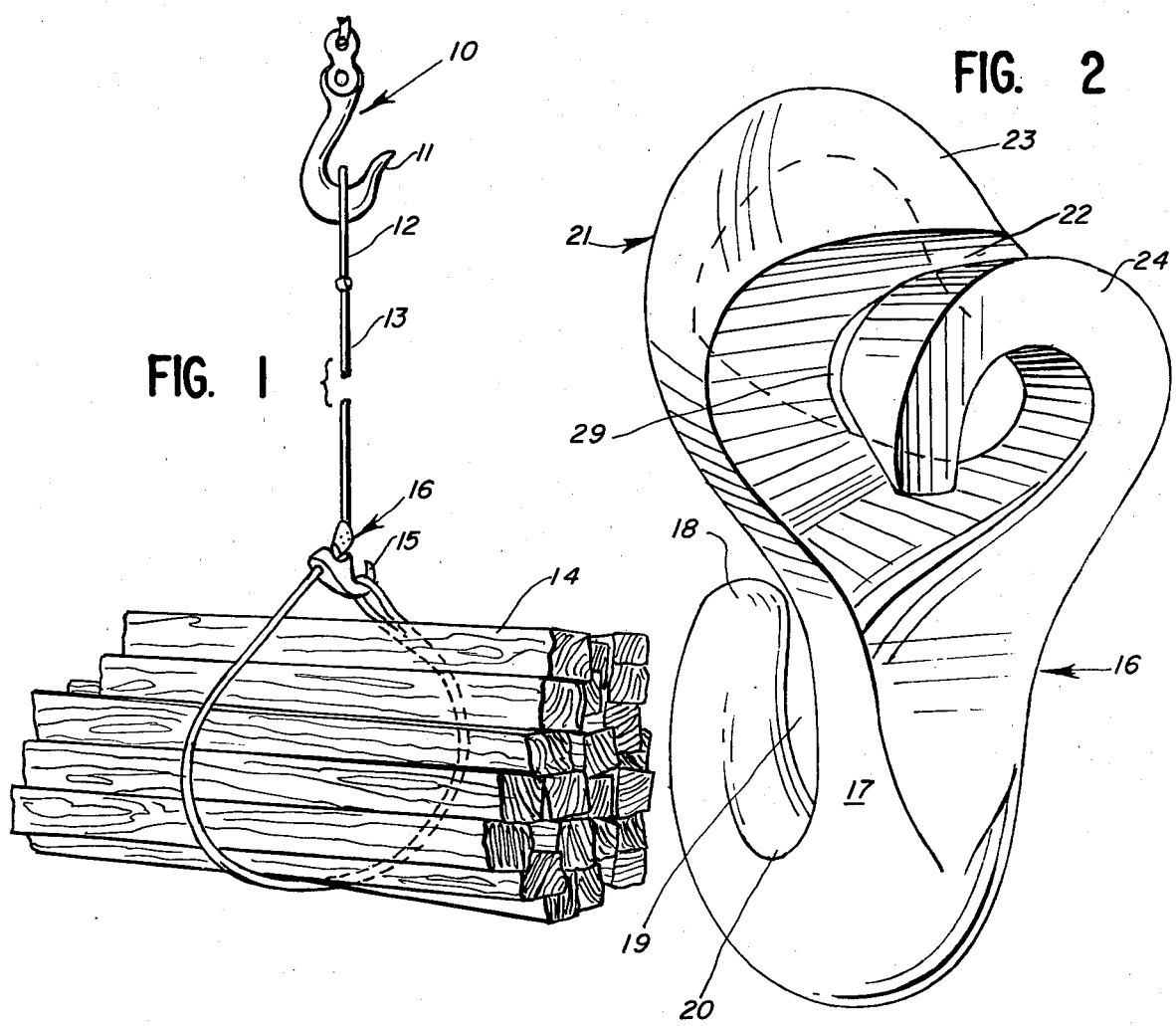
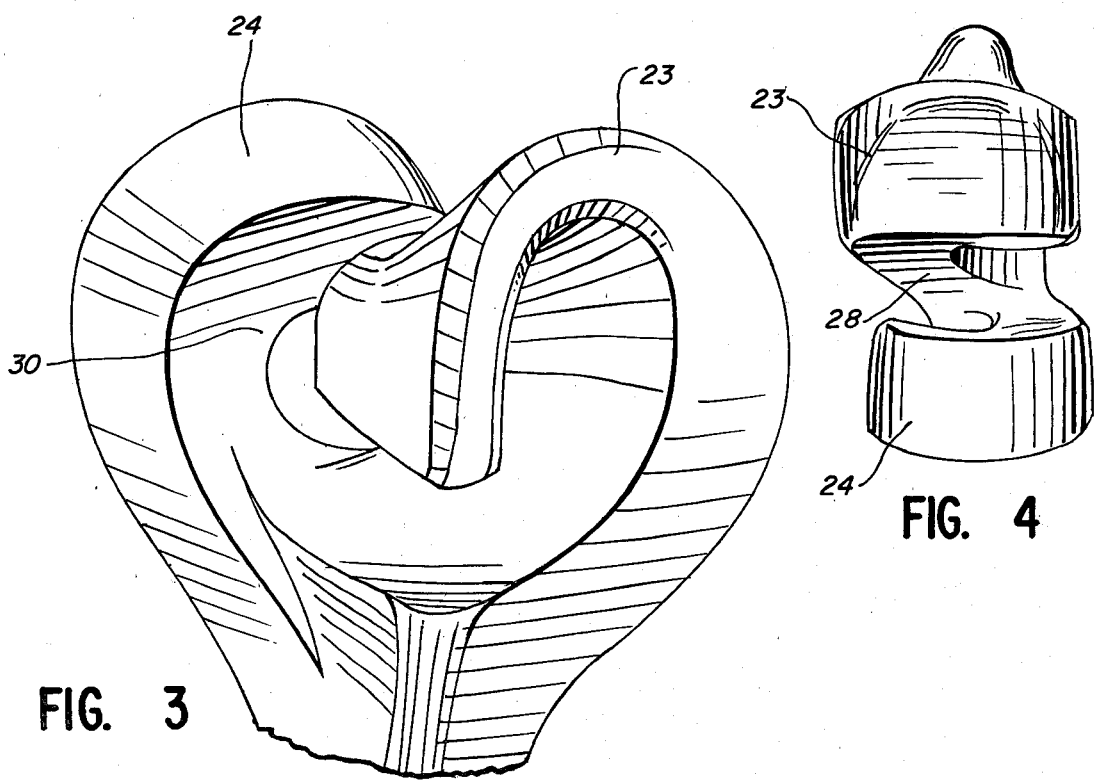

SLING HOOK

BACKGROUND AND SUMMARY OF INVENTION

This invention relates to a sling hook and, more particularly, to a sling hook equipped with a curved slot in the sleeve portion to facilitate installation by twisting rather than threading as is conventional.

The hook with which the instant invention is concerned is advantageously employed in conjunction with wire rope to support loads for movement from one place to another—as in loading of ships, land vehicles, in logging, etc. The sling hook is a unitary member having a curved bill at one end and a sleeve or wire rope receiving passageway at the other, illustrated generally in U.S. Pat. Nos. 2,381,531 and 4,073,042.

Although the art workers have tried for many years to avoid the laborious threading operation (wherein the end of the rope is threaded through the eye of the sleeve—see, for example, U.S. Pat. Nos. 1,420,487 and 1,572,347—the commercial art has remained static and tolerated these difficulties. For example, the hook sleeve portion must be threaded onto the rope before the rope ends are fashioned into eyes or loops. Notwithstanding the great advantage of being able to have the eyes or loops formed in the ends of the wire rope at an earlier time and at a different place from the installation of the hook, the art has put up with this disadvantage.

Another factor always present in the mind of the user is the safety or integrity of the hook. Should either the hook or rope fail, there is the possibility of great injury (as well as property damage). Prior art hooks have been characterized by the lack of any way of quickly establishing whether the hook has been stressed beyond its yield point and thus is potentially unsafe.

The instant invention overcomes these disadvantages by introducing a curved slot into the sleeve portion of the hook in such a way as to make possible a twisting rather than a threading installation of the wire rope and which is so constructed and arranged to divide the sleeve portion into a pair of unequal lug eyes. This results in an unusual and unexpected strength in the overall hook—load testing establishing that the hook ultimately fails in the shank or bill portion as in the conventional hook, and not in the split sleeve portion. More particularly, the provision of this single change from the prior art, results in two beneficial results—ease of the installation and a visual indication of overstressing.

Other objects and advantages of the invention may be seen in the details of the ensuing specification.

DETAILED DESCRIPTION

The invention is described in conjunction with an illustrative embodiment in the accompanying drawing, in which—

FIG. 1 is a fragmentary perspective view of apparatus operating in an environment utilizing the inventive sling hook;

FIGS. 2 and 3 are opposite perspective views of the inventive hook;

FIG. 4 is a top plan view of the hook;

Figure 5:
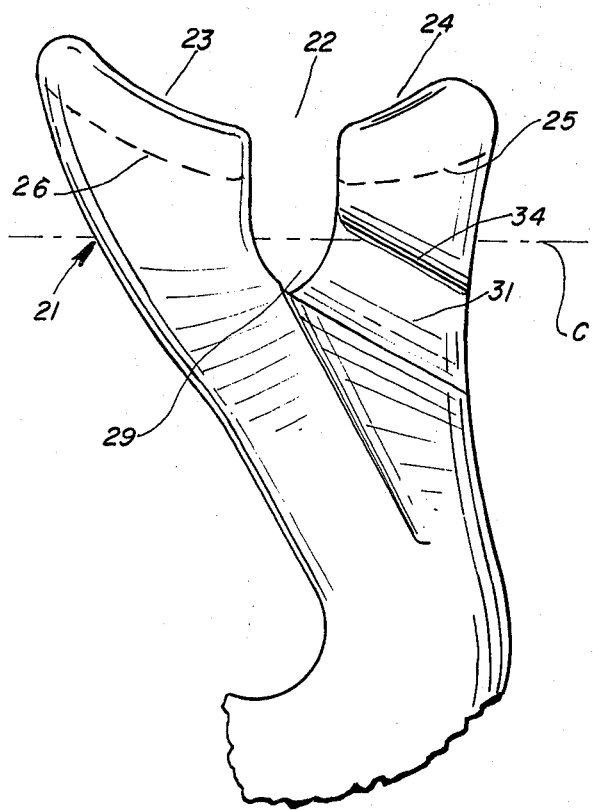
FIG. 5 is a side elevational view of the hook corresponding essentially to FIG. 2.

In the illustration given and with reference first to FIG. 1, the numeral 10 designates generally a hoist chain equipped with a swivel hook 11 at the bottom thereof. Not shown is the means for moving the hoist chain 10—generally a crane or the like.

Secured to the hook 11 is a loop or eye 12 of a wire rope 13 which is seen to extend around a load of two-by-fours generally designated 14. The lower end of the rope 13 is equipped with another eye as at 15 which is received within the inventive hook generally designated 16.

Referring now to FIG. 2, the sling hook 16 is seen to include a unitary body having a shank 17 curving downwardly and forwardly into a bill 18. The upper end of the bill 18 is in spaced relation to the shank 17 to provide a throat 19 adapted to receive a wire rope (not shown) therein. The throat is downwardly arcuate as at 20 to provide a nadir to the bottom of the wire rope.

The hook 16 at its upper end is equipped with an integral sleeve portion generally designated 21 which is also adapted to receive a wire rope.

According to the invention, the sleeve portion 21 is generally centrally longitudinally thereof equipped with a curved slot 22 which divides the sleeve portion into a pair of lug eyes—a forward lug eye 23 and a rear lug eye 24. The directions indicated are with respect to the bill 18—the bill 18 and the throat 19 being considered the forward part of the hook 16.

Figure 7:
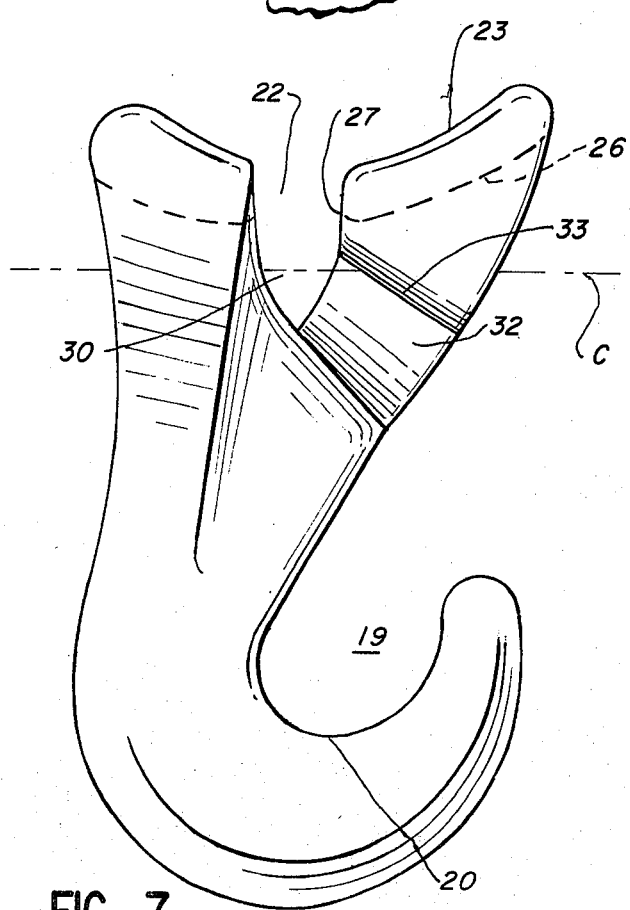
FIG. 7 is another side elevation of the hook— taken from the side opposite to that seen in FIG. 5 and corresponding generally to the view seen in perspective in FIG. 3.

From a consideration of FIGS. 5 and 7 in particular, it will be appreciated that the forward lug eye 23 is larger, i.e., of greater length in the direction of rope bearing than the rear lug eye 24. This has been found advantageous in that the forward lug eye 23 will take the majority of the load when the hook is used in the normal manner. For example, in the so-called ⅝" size, the bearing surface 25 (see FIG. 5) of the smaller lug eye 24 is approximately 32 mm. long, i.e., in the direction the wire rope lies within the sleeve portion 21. The corresponding length of the bearing surface 26 in the lug eye 23 is 48 mm. long—or approximately 50% greater. Generally we find that for optimum performance, the bearing surface 26 should be from about 35% to about 65% greater than the length of the bearing surface 25.

Referring now to FIG. 7, it will be seen that the rear end portion 27 of the forward lug eye 23 is approximately aligned with the nadir 20 of the throat 19. When sling hooks are constructed according to the instant invention and tested under tension, i.e., a pulling load on the bearing surfaces 26 and 25 and a further pulling load on a line placed within the throat 19, it is found that the lug eyes move toward each other to close the slot 22 and there is still no ultimate failure within the sleeve portion 21. As in the case with conventional sling hooks—with unslotted sleeve portions—the failure occurs in the shank or bill.

Figure 6:
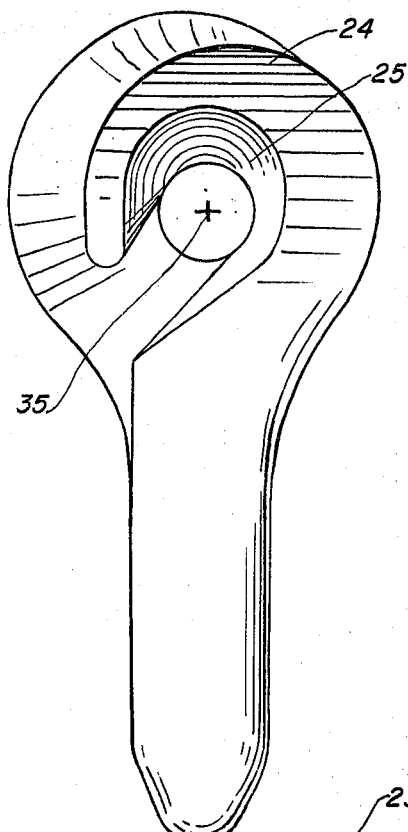
FIG. 6 is a rear end elevational view of the hook.
Figure 8:
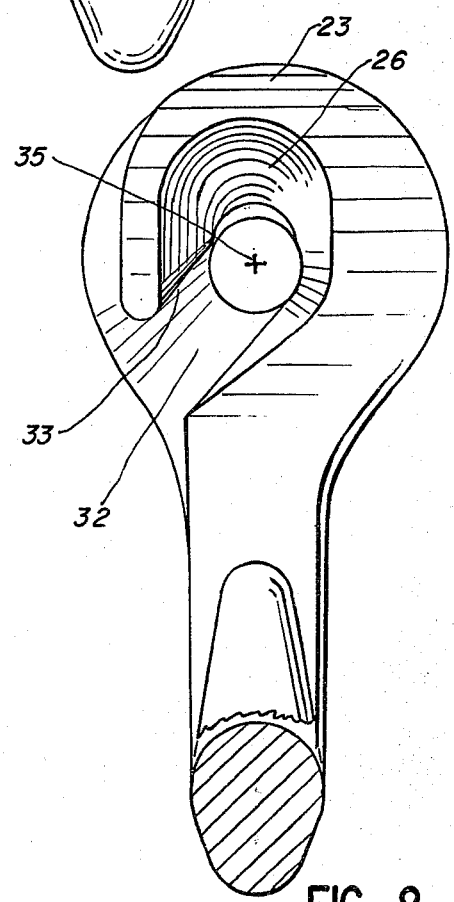
FIG. 8 is a front end elevational view.

The slot 22 is generally curved. In the specific illustration given, the slot 22 includes a central straight portion 28 (see FIG. 4) which is connected by curved portions as at 29 (see FIG. 2) and 30 (see FIG. 3) with further straight portions 31 (see FIG. 5) and 32 (see FIG. 7), respectively. The slot portion 32 thus defines a straight or generally flat end 33 on the lug eye 23 and the slot 31 similarly defines a straight or flat end 34 on the lug eye 24. In each case, the end slot portions 31 and 32 extend downwardly and in diverging relation to the rope centerline C (see FIGS. 5 and 7). The angle between the end 34 on the rear lug eye and the rope centerline C is between 20° and 50°. The angle between the end 33 on the front lug eye and the rope centerline is also in the range of 20°–50°. Optimally, the angle between the end surfaces and the rope centerline should be about 30°. Further, the width of the centerline slot portion 28 is approximately the same as the diameter of the bore 35 (see FIGS. 6 and 8) defined by the lug eyes. For best results, the ratio or the width of the slot 28 should not be greater than 1.75 the rope diameter and preferably about 1.5 to conserve metal and achieve stabilization of the rope. Optimum stabilization is achieved when the ratio is about 1.05.

The specified angle helps insure that the tope stays on the hook. In this case, the elastic properties of the rope in bending are used as a locking mechanism to keep the hook on the rope. This is due to the fact that the rope must be elastically deformed to attache the hook to it or remove it. As long as the rope has not been overloaded and plastically deformed, the elastic properties of the rope tend to keep the hook on the sling.

With the invention, a rigger is enabled to put a sling hook on a sling that is at both ends previously made into eyes. While it is possible to put the rope onto the assembled sling, it is impossible for the hook to slip off the sling, over the terminals or lug eyes. Although the hook can be intentionally taken off the sling, an operator must manipulate the rope carefully to do so.

In operation, the rope is inserted into the sleeve section by laying the body of the rope sling into the top slot 22. The sling hook is then rotated 90° such that the rope body snaps into place in the sleeve, directly over the main point of the hook. Even as the load increases to failure, the lug eyes 23 and 24 bend toward each other before hook failure. This is a significant advantage of the invention—giving a visual indication to the user that the hook has been overloaded, but well under the breaking load of the hook.

This permits end user flexibility in a manner not heretofore possible. He may use a sling either with or without a hook on it. In many cases the user may have slings of many different lengths. He need not have a hook permanently attached to any of them. If he wants to use a hook on a short sling, he reaches into his tool box, pulls out the inventive hook and puts it on the short sling. If he wants to go to a longer sling, he can move the hook from one sling to another. If, however, the hook has been overloaded to the point of yielding in the lug eyes, then he cannot remove it from the sling easily. This is an indication to the user that the hook should be replaced and, in fact, the sling has been overloaded and probably should be replaced as well. Thus, the inventive construction not only provides an easily installed hook but also one that gives an unmistakable indication of overloading.

We claim:

1. A sling hook comprising a unitary body having a shank curving downwardly and forwardly into a bill with the upper end of said bill being in spaced relation to said shank to provide a throat adapted to receive a wire rope therein, said throat being downwardly arcuate to provide a nadir for the bottom of said wire rope, said body at the upper end being equipped with an integral sleeve portion adapted to receive a wire rope sling and providing a downwardly facing elongated bearing surface therefor, said sleeve portion being equipped with a generally curved slot dividing the same into oppositely extending forward and rear lug eyes and interrupting said bearing surface, said slot accommodating receipt of said sling by twisting the same rather than threading the same into a conventional eye, the rear portion of said forward lug eye being generally aligned with said throat nadir, said forward lug eye having a longer bearing surface than said rear lug eye, each lug eye terminating in a free straight end with said free ends extending downwardly and away from said slot to a point below the center line of a wire rope in said sleeve portion.

2. The structure of claim 1 in which the length of said forward lug eye bearing surface is about 35% to about 65% greater than that of said rear lug eye.

3. The structure of claim 2 in which said curved slot defines a relatively straight end for each lug eye, each said end extending in downward, diverging relation to the centerline of a wire rope in said sleeve portion in proceeding away from said slot.

4. The structure of claim 3 in which said diverging relation is at an angle of from about 20 degrees to about 50 degrees.

5. The structure of claim 1 in which said slot has a generally straight portion at the upper side of said sleeve portion whereby said lug eyes are adapted to move toward each other under excessive stress and thereby give a visual indication of overloading.

6. A sling hook comprising a unitary body having a shank curving downwardly and forwardly into a rope-receiving bill, said body at the upper end being equipped with an integral sleeve portion adapted to receive a wire rope sling and providing a downwardly facing elongated bearing surface therefor, said sleeve portion being equipped with a segmental slot dividing the same into oppositely extending forward and rear lug eyes and interrupting said bearing surface, said slot accommodating receipt of said sling by twisting the same rather than threading the same into a conventional eye, said forward lug eye having a longer bearing surface than said rear lug eye, said segmental slot providing a space for said lug eyes to move toward each other to provide a visual indication of overloading, each lug eye terminating in a free straight end with said free ends extending downwardly and away from said slot to a point below the center line of a wire rope in said sleeve portion.

7. The structure of claim 6 in which said segmental slot has a central portion providing said space and end generally arcuate portions defining the ends of said lug eyes.

8. The structure of claim 6 in which said space is greater than the diameter of said rope but not greater than 1.75 the rope diameter.

9. The structure of claim 8 in which the said ratio is about 1.05.

* * * * *